United States Patent
Bitto et al.

(10) Patent No.: US 12,392,649 B2
(45) Date of Patent: Aug. 19, 2025

(54) METHOD FOR PUTTING A CORIOLIS FLOW METER INTO OPERATION

(71) Applicant: Endress+Hauser Flowtec AG, Reinach (CH)

(72) Inventors: Ennio Bitto, Aesch (CH); Martin Josef Anklin, Dornach (CH); Benjamin Schwenter, Ettingen (CH)

(73) Assignee: Endress+Hauser Flowtec AG, Reinach (CH)

( * ) Notice: Subject to any disclaimer, the term of this patent is extended or adjusted under 35 U.S.C. 154(b) by 228 days.

(21) Appl. No.: 17/997,888

(22) PCT Filed: Apr. 19, 2021

(86) PCT No.: PCT/EP2021/060047
§ 371 (c)(1),
(2) Date: Nov. 3, 2022

(87) PCT Pub. No.: WO2021/223989
PCT Pub. Date: Nov. 11, 2021

(65) Prior Publication Data
US 2023/0221157 A1  Jul. 13, 2023

(30) Foreign Application Priority Data
May 5, 2020  (DE) .................... 10 2020 112 154.7

(51) Int. Cl.
*G01F 1/84* (2006.01)
*G01N 9/32* (2006.01)
*G01N 11/04* (2006.01)

(52) U.S. Cl.
CPC .......... *G01F 1/8431* (2013.01); *G01F 1/8422* (2013.01); *G01F 1/8427* (2013.01);
(Continued)

(58) Field of Classification Search
CPC ..... G01F 1/8431; G01F 1/8422; G01F 1/8427
(Continued)

(56) References Cited

U.S. PATENT DOCUMENTS 6,327,915 B1  12/2001  Van Cleve et al.
10,209,113 B2  2/2019  Young et al.
(Continued)

FOREIGN PATENT DOCUMENTS

DE     10351313 A1   5/2005
DE  102018119332 A1   2/2020
(Continued)

OTHER PUBLICATIONS

Clarke, D.W., Non-Linear Control of the Oscillation Amplitude of a Coriolis Mass-Flow Meter, Eur. J. Control, vol. 4, issue 4, pp. 196-207 (1998) (Abstract).

*Primary Examiner* — Peter J Macchiarolo
*Assistant Examiner* — Rodney T Frank
(74) *Attorney, Agent, or Firm* — Christopher R. Powers; Endress+Hauser (USA) Holding, Inc.

(57) ABSTRACT

The present disclosure relates to a method for putting a Coriolis flow meter into operation, in particular a Coriolis flow meter for pharmaceutical bioprocess applications, the method comprising the method steps of: inserting the measuring tube arrangement into the receptacle of the carrier device; causing the measuring tube to vibrate by means of the excitation signal arriving at the vibration exciter and provided by the operating circuit; determining a measurement value of a state variable that is used as a measure for checking whether the measuring tube in the carrier device is in a steady state; and determining the mass flow rate measurement value when a difference between the measure-
(Continued)

ment value of the state variable and a reference value of a reference variable lies below an upper limit value and exceeds a lower limit value.

20 Claims, 3 Drawing Sheets

(52) U.S. Cl.
CPC ............ *G01F 1/8477* (2013.01); *G01N 9/32* (2013.01); *G01N 11/04* (2013.01)

(58) Field of Classification Search
USPC .................................................. 73/861.355
See application file for complete search history.

(56) References Cited

U.S. PATENT DOCUMENTS

| | | |
|---|---|---|
| 2007/0186684 A1 | 8/2007 | Pham |
| 2010/0005906 A1 | 1/2010 | Shimizu et al. |
| 2016/0231156 A1 | 8/2016 | Ikadai et al. |
| 2017/0146380 A1* | 5/2017 | Young .................. G01F 1/8409 |

FOREIGN PATENT DOCUMENTS

| | | |
|---|---|---|
| EP | 1807681 A2 | 7/2007 |
| EP | 3495784 A1 | 6/2019 |
| WO | 2007035376 A2 | 3/2007 |
| WO | 2011099989 A1 | 8/2011 |
| WO | 2019017891 A1 | 1/2019 |

* cited by examiner

METHOD FOR PUTTING A CORIOLIS FLOW METER INTO OPERATION

CROSS-REFERENCE TO RELATED APPLICATIONS

The present application is related to and claims the priority benefit of German Patent Application No. 10 2020 112 154.7, filed on May 5, 2020, and International Patent Application No. PCT/EP2021/060047, filed Apr. 19, 2021, the entire contents of which are incorporated herein by reference.

TECHNICAL FIELD

The invention relates to a method for putting a Coriolis flow meter into operation, in particular a Coriolis flow meter for preferably pharmaceutical bioprocess applications.

BACKGROUND

Process measurement technology field devices with a sensor of the vibration type and especially Coriolis flow meters have been known for many years. The basic structure of such a measuring device is described in, for example, EP 1 807 681 A1, wherein reference is made in full to this publication with respect to the structure of a generic field device within the scope of the present invention.

Typically, Coriolis flow meters have at least one or more vibratable measuring tubes that can be set into vibration by means of a vibration exciter. These vibrations are transmitted along the tube length and are varied by the type of flowable medium located in the measuring tube and by its flow rate. At another point in the measuring tube, a vibration sensor or, in particular, two vibration sensors spaced apart from one another can record the varied vibrations in the form of a measurement signal or a plurality of measurement signals. An evaluation unit can then determine the mass throughflow, the viscosity, and/or the density of the medium from the measurement signal(s).

Coriolis flow meters with interchangeable disposable measuring tube arrangements are known. For example, in WO 2011/099989 A1, a method is thus taught for producing a monolithically formed measuring tube arrangement of a Coriolis flow meter with bent measuring tubes, wherein the measuring tube body of the respective measuring tubes is at first formed as a solid made up of a polymer, and the channel for conducting the flowable medium is subsequently machined into said solid. WO 2011/099989 A1, like U.S. Pat. No. 10,209,113 B2, teaches a connecting body that is configured to receive and support a replaceable measuring tube arrangement comprising thin-walled plastic tubes. The measuring tube arrangement is fastened via the connecting body in a carrier device equipped with the necessary exciters and sensors.

The mechanical properties of the measuring tube arrangements suitable for Coriolis flow meters can vary greatly, which is why specific parameters such as the calibration factor and zero point must be determined prior to use in a Coriolis flow meter. It has been found that the zero point determined in the adjustment method generally deviates from the actual zero point of the exchangeable measuring tube arrangement in use. Such a deviation is difficult to correct. One reason for this is that the deviation depends on the degree to which the measuring tube arrangement is fastened in the carrier device, which is difficult to reproduce for different operators.

SUMMARY

The object of the invention is to provide a method for putting the Coriolis flow meter into operation, with which method the deviations are reduced.

The object is achieved by the method according to the invention for putting a Coriolis flow meter into operation, in particular a Coriolis flow meter for preferably pharmaceutical bioprocess applications,
wherein the Coriolis flow meter comprises:
a measurement tube arrangement,
wherein the measuring tube arrangement comprises at least one measuring tube through which a medium can flow;
at least one vibration exciter that is configured to excite the measuring tube arrangement, in particular the measuring tube, to vibrate, in particular comprising an excitation magnet and an excitation coil;
wherein at least one component of the vibration exciter, in particular the excitation magnet, is arranged on the measuring tube;
at least one vibration sensor that is configured to detect the vibrations of the at least one measuring tube, in particular comprising a sensor magnet and a sensor coil,
wherein at least one component of the vibration sensor, in particular the sensor magnet, is attached to the measuring tube arrangement;
a carrier device comprising a receiving device, and in particular the sensor coil and the excitation coil,
wherein the measuring tube arrangement can be arranged at least in part in the receptacle of the receiving device and can be mechanically detachably connected to the carrier device;
an operating circuit,
wherein the operating circuit communicates with the vibration exciter, in particular with the excitation coil,
wherein the operating circuit is configured to operate the vibration exciter, in particular the excitation coil, with at least one excitation signal, in particular an excitation current;
a measuring circuit, in particular arranged in the carrier device,
wherein the measuring circuit communicates with the at least one vibration sensor, in particular with the excitation coil,
wherein the measuring circuit is configured to determine at least one vibration signal at the vibration sensor;
an evaluation circuit,
wherein the evaluation circuit communicates with the measuring circuit,
wherein the evaluation circuit is configured to determine and provide mass flow rate measurement values, viscosity values and/or density measurement values and/or values of a variable derived therefrom, at least on the basis of the vibration signal or on the basis of a variable derived from the vibration signal;
comprising the method steps:
inserting the measuring tube arrangement into the receptacle of the carrier device;
causing the measuring tube to vibrate by means of the excitation signal arriving at the vibration exciter and provided by the operating circuit;
determining a measurement value of a state variable that is used as a measure for checking whether the measuring tube in the carrier device is in a steady state; and
determining the mass flow rate measurement value when a difference between the measurement value of the state variable and a reference value of a reference variable lies below an upper limit value and exceeds a lower limit value.

The carrier device can comprise a fixing device that is designed to fix the measuring tube arrangement in the receptacle. In this case, the insertion of the measuring tube arrangement is followed by the fixing of the measuring tube arrangement on the carrier device.

The excitation signal serves to excite a drive mode of the at least one measuring tube.

In addition to the basic flexural vibration mode F1, the drive mode can be vibration mode F2 and/or vibration mode F3. The excitation signal can also be selected such that the excitation frequency deviates by a factor or a summand from a natural frequency of the respective vibration modes.

Determining whether a steady state is present in the at least one measuring tube has the advantage that the comparison between the measurement value of the state variable and the reference value of the reference variable is not carried out directly after installation, and is thus falsified by installation-related disturbances. A mass flow rate measurement value is determined only after the installation-related disturbances have subsided. A deviation from a steady state is present, for example, if the at least one measuring tube is not sufficiently fixed in the carrier device, is arranged incorrectly, disturbances are coupled in or if there is partial filling.

The reference value can be stored on the measuring tube arrangement. In pharmaceutical bioprocess applications, what are referred to as manifolds are known in which sensors for monitoring process parameters and/or valves are integrated in hose systems. The reference value can also be stored in or on the manifold or in the packaging provided for maintaining the sterility of the manifold. Alternatively, the reference value can be made available by the carrier device communicating with a control system or a cloud.

A steady state in the case of a measuring tube is present when temporally dependent interference that are generated due to the installation of the measuring tube arrangement in the carrier device become negligibly small. This does not include interference that occurs exclusively due to the fastening of the measuring tube arrangement in the carrier device and that is substantially temporally independent. Such interference can shift the factory-determined zero point of the mass flow rate. According to the invention, this shift is corrected after the measuring tube has reached the steady state. The correction takes place, for example, by replacing the factory-determined zero point by a new zero point determined for the present arrangement.

Advantageous embodiment of the invention are the subject matter of the dependent claims.

One embodiment provides that the measuring circuit is configured to determine an excitation current impressed on the excitation coil,
wherein the state variable is the excitation current or a variable dependent at least on the excitation current.

In this case, the excitation current can be measured by means of a measuring circuit or as described in WO 2007/035376 A2, without explicitly measuring the said excitation current.

In Coriolis flow meters according to the prior art, the excitation current at the excitation coils or the variable dependent at least on the excitation current is primarily monitored. If the installation of the measuring tube arrangement is defective or if the at least one measuring tube is not sufficiently decoupled from the environment, this results in the excitation current exceeding an upper limit value or falling below a lower limit value. In this case, a time interval is awaited and the check of the excitation current or of the variable dependent on the excitation current is repeated and/or a message is output such that, for example, the measuring tube arrangement cannot assume a steady state.

One embodiment provides that the state variable is a damping of the measuring tube, in particular a lateral mode damping or a torsional mode damping, or a variable dependent on the damping.

Determining the damping of the vibrating measuring tube in order to, for example, determine a density of the medium to be conducted, is known. If the determined measurement value of the damping is above an upper limit value, this is an indicator of faulty installation and that the vibrating measuring tube is not sufficiently decoupled from the environment. If the determined measurement value of the damping is below a lower limit value, this is an indicator that an inoperative vibration excitation is applied to the measuring tube that has not yet subsided at the time of the determination. In both cases there is no steady state.

One embodiment provides for:
determining the vibration of the measuring tube arrangement by means of the vibration signal, in particular voltage signal, detected at the vibration sensor,
wherein the determined vibration signal has a vibration frequency $f_M$ and in particular a vibration amplitude $A_M$.

One embodiment provides that the state variable is the measurement frequency $f_M$ or a measured variable dependent on the measurement frequency $f_M$.

A stable vibration frequency is an important prerequisite for correctly putting the Coriolis flow meter into operation. The stability of the vibration frequency indicates nothing about distortions during installation, but does indicate faulty process conditions such as multiphase states. For this reason, it is advantageous if the measurement frequency $f_M$ or a measured variable dependent on the measurement frequency $f_M$ is taken into consideration when checking whether there is a steady state in the measuring tube in the carrier device.

One embodiment provides that the state variable is a density measurement value of the present medium or a variable dependent at least on the density measurement value of the medium.

A plurality of conventional Coriolis flow meters are designed and configured to determine the density of the medium to be conducted. According to the invention, the density of the medium and a deviation from the reference value are first determined before the determination of the mass flow rate is initiated. If the deviation from the reference value is too great, this is an indication that there is no steady state in the at least one measuring tube. The reference value can be, for example, the density value of air or water.

One embodiment provides that the state variable is the in particular dynamic viscosity measurement value of the present medium or a variable dependent at least on the viscosity measurement value of the medium.

A plurality of conventional Coriolis flow meters are designed and configured to determine a viscosity, in particular the dynamic viscosity of the medium to be conducted. According to the invention, the dynamic viscosity of the medium and a deviation from the reference value are first determined before the determination of the mass flow rate is imitated. If the deviation from the reference value is too great, this is an indication that there is no steady state in the at least one measuring tube. The reference value can be, for example, the viscosity value of air or water.

One embodiment provides that the state variable is dependent on a reciprocal of the measurement frequency $f_M$, in particular on a square of the reciprocal of the measurement frequency $f_M$, or dependent at least on a measured variable dependent on the reciprocal of the measurement frequency $f_M$ or on the square of the reciprocal of the measurement frequency $f_M$.

One embodiment provides that the state variable is the measurement amplitude $A_M$ or a variable dependent on the measurement amplitude $A_M$.

One embodiment provides for:
determining the vibration of the measuring tube arrangement by means of a first vibration signal detected at a first vibration sensor,
wherein the determined first vibration signal has a first measurement frequency $f_{M,1}$ and in particular a first measurement amplitude $A_{M,1}$,
wherein at least one component of the first vibration exciter, in particular a first excitation magnet, is arranged on the measuring tube arrangement;
determining the vibration of the measuring tube arrangement by means of a second vibration signal detected at a second vibration sensor,
wherein the determined second vibration signal has a second measurement frequency $f_{M,2}$ and in particular a first measurement amplitude $A_{M,2}$,
wherein at least one component of the second vibration exciter, in particular a second excitation magnet, is arranged on the measuring tube.

One embodiment provides that the state variable is the first vibration signal or a variable dependent at least on the first vibration signal, and/or
wherein the state variable is the second vibration signal or a variable dependent at least on the second vibration signal.

One embodiment provides that the measuring tube arrangement or the carrier device comprises at least one temperature sensor,
wherein the state variable is a temperature measurement value determined by the temperature sensor.

Temperature sensors are used in Coriolis flow meters in order to compensate for temperature-related influences on the density, for example. According to the invention, a deviation of the determined temperature measurement value from a reference value determines whether there is a steady state in the measuring tube. Thus, first a temperature measurement value of the temperature sensor is determined and compared with the reference value before the mass flow rate is determined.

One embodiment provides that the measuring tube arrangement or the carrier device comprises two temperature sensors, each of which is configured to determine a temperature of the at least one measuring tube,
wherein the state variable is a difference or a variable dependent on the difference of the two determined temperatures.

One embodiment provides that the measuring tube arrangement is fluidically coupled to a hose system and/or plastic tube system,
wherein the hose system and/or plastic tube system comprises an integrated sensor,
wherein the reference value is determined by means of the sensor,
wherein the sensor is a viscosity sensor, a density meter or a temperature sensor.

According to the embodiment, the reference value is not stored on the measuring tube arrangement. Instead, the reference value is determined by means of a sensor integrated in the hose system and/or plastic tube system. A comparison between the reference value determined using the sensor and the measurement value determined by means of the Coriolis flow meter indicates whether a steady state is present.

One embodiment provides that the carrier device has a readout unit that is configured to read sensor information stored in the measuring tube arrangement, in particular after the measuring tube arrangement is inserted into the receptacle of the carrier device, comprising the method step of:
reading out the sensor information stored in the measuring tube arrangement.

The readout unit can be based on an optical, electrical or electromagnetic principle. The sensor information can be stored in a data memory that is read out via a contact or contactlessly, or can be designed to be optically identifiable.

One embodiment provides that the sensor information comprises the reference value of the reference variable.

One embodiment provides for:
performing a plausibility comparison between the sensor information, in particular with the addition of an upper tolerance limit and/or a lower tolerance limit and the determined flow rate measurement value,
wherein the sensor information comprises a measurement value of a mass flow rate zero point previously determined by means of an adjustment method.

If the plausibility comparison is negative, the mass flow rate zero point provided is used for the further determination of the mass flow rate. The comparison according to the invention can be repeated automatically at a later time or initiated by the user.

One embodiment provides for:
setting the determined mass flow rate measurement value as a mass flow rate zero point.

If the plausibility comparison is positive, the determined mass flow rate measurement value is used as a new mass flow rate zero point for determining the mass flow rate. An installation-related deviation of the mass flow rate zero point is thus corrected.

One embodiment provides that determining the measurement value of the state variable has to take place under the exclusive presence of gas, in particular air or a non-flowing medium, in particular water.

For correct putting into operation, it is imperative that the check as to whether a steady state is present is carried out exclusively in the presence of a gas or a non-flowing medium. If a density measurement value is determined for the check, it is advantageous if the gas or the non-flowing medium is known. The gas can, for example, be air and the non-flowing medium can be water.

One embodiment provides for:
initiating a comparison of the mass flow rate zero point in the case a flowing medium only when the currently determined mass flow rate measurement value is less than 10%, in particular less than 5% and preferably less than 3% of a reference mass flow and if the currently determined density measurement value and/or the currently determined viscosity value corresponds to that of water or air.

According to the embodiment, an automated comparison can be initiated, under the condition that the currently determined mass flow rate measurement value is less than 10%, in particular less than 5% and preferably less than 3%, and the current density measurement value and/or viscosity value corresponds to that of water or air or corresponds to the actual density and/or viscosity of the known medium.

BRIEF DESCRIPTION OF THE DRAWINGS

The invention is explained in greater detail with reference to the following figures. The following are shown.

DETAILED DESCRIPTION

Figure 1:
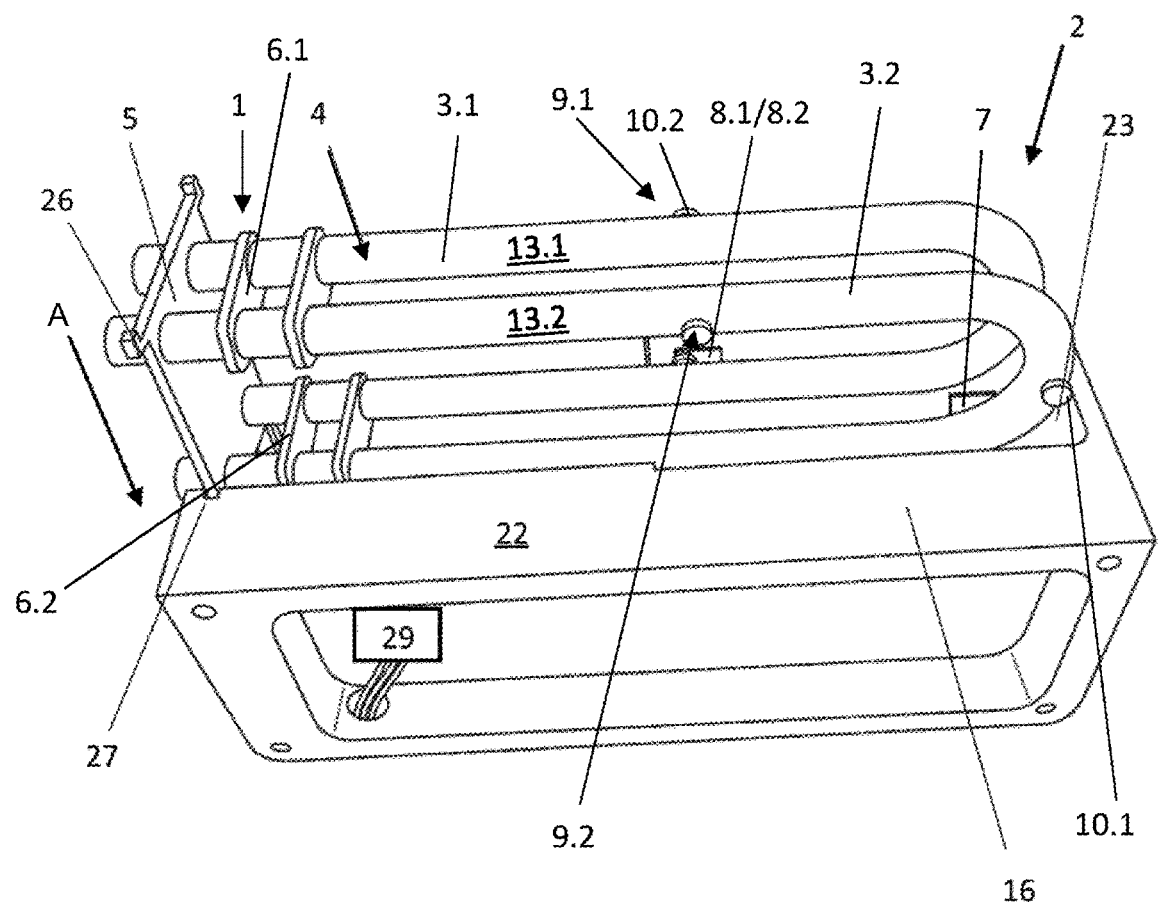
FIG. 1 shows a Coriolis flow meter suitable for pharmaceutical bioprocess applications.

FIG. 1 shows an embodiment of the measuring tube arrangement 4 according to the invention. The measuring tube arrangement 4 is suitable for being replaceably inserted into a measuring device. For this purpose, only individual components of the vibration exciter and of the vibration sensors, in this case the respective magnet arrangements 9.1, 9.2, are attached to the measuring tube arrangement 4. The further components are arranged in a carrier device 16, in particular in the receptacle, which is suitable and designed for receiving the measuring tube arrangement 4. The measuring tube arrangement 4 comprises two bent measuring tubes 3.1, 3.2 that run in parallel to one another and are connected to one another via a coupler arrangement 1 consisting of four coupler elements 6, and via a connecting body 5. Two coupler elements 6.1 are connected in an integrally bonded manner in an inlet, and two coupler elements 6.2 are connected in an integrally bonded manner in the outlet of the respective measuring tubes 3.1, 3.2. The measuring tubes 3.1, 3.2 are shaped such that the flow direction, represented by two arrows, in the inlet is oriented oppositely to the flow direction in an outlet. A flow divider that has a process connection for connecting to a hose system and/or plastic tube system is respectively arranged in the inlet and in the outlet. According to one embodiment, precisely one flow divider body can be provided instead of two separate flow dividers, which flow divider body is slid onto the inlet and outlet and also contributes to decoupling the measuring tube arrangement 4 from the environment after installation in the carrier device. The individual coupler elements 6 are plate-shaped and are in one or two parts. The coupler elements may respectively completely or only partially encompass the measuring tubes. The measuring tubes 3.1, 3.2 are U-shaped, i.e., they respectively have two legs that run substantially in parallel to one another and are connected via a bent partial segment. A magnet arrangement 9.1, 9.2 is arranged on each measuring tube 3.1, 3.2. In the bent partial segment, a magnet 10.1 of the magnet arrangement 9.1 is arranged and forms a component of the vibration exciter. A magnet 10.2 that forms a part of the vibration exciter is respectively attached in the respective legs. The magnets 10 are attached to attachment surfaces. In the embodiment, the attachment surfaces are located on the respective measuring tubes 3.1, 3.2.

The measuring tube arrangement 4 is partially inserted into a receptacle 23 of a carrier device 16. An arrow indicates the insertion direction. In the embodiment, the latter runs perpendicularly to a longitudinal direction of the receptacle 23. The receptacle can also be designed such that the measuring tube arrangement 4 is to be inserted in the longitudinal direction of the receptacle (not shown). The carrier device 16 has a measuring and/or operating circuit 29 that is connected to the vibration exciters and vibration sensors, in particular to the respective coil systems, and is configured to generate and/or detect a temporally alternating magnetic field. The carrier device 16 has a carrier device body 22 in which the receptacle 23 is located. The connecting body 5 of the measuring tube arrangement 4 has mounting surfaces 26 that serve to arrange the measuring tube arrangement 4 in a predetermined position in the carrier device 16. According to the depicted embodiment, the perpendicular of the mounting surface 26 points perpendicularly to the longitudinal direction of the measuring tube arrangement 4. According to a further advantageous embodiment, the perpendicular of the mounting surface 26 points in the direction of the longitudinal direction of the measuring tube arrangement 4. The surface of the carrier device body 22 in contact with the mounting surface 26 of the connecting body 5 is the bearing surface 27.

The carrier device 16 has two side surfaces that are oriented in parallel to one another and delimit the receptacle 23 transversely to the longitudinal direction of the receptacle. The coil devices of the vibration sensors 8.1, 8.2 and the coil device of the vibration exciter 7 are arranged in the side surfaces. The coil devices of the vibration sensors 8.1, 8.2 are arranged in the longitudinal direction of the receptacle with respect to the coil device of the vibration exciter 7. All three coil devices are located in one coil plane. Furthermore, the three coil devices are designed as a plate coil and embedded into the side surface. At the side surface, three coil devices are arranged substantially opposite the three coil devices. A respective guide that extends perpendicularly to the longitudinal direction of the receptacle 23 and in parallel to the coil plane is incorporated into the two side surfaces. According to the depicted embodiment, the receptacle extends over two end faces of the receptacle 23. This enables an insertion of the measuring tube arrangement 4 perpendicularly to the longitudinal direction of the measuring tube arrangement 4. According to a further embodiment, the receptacle extends exclusively over one end face. In this case, the measuring tube arrangement 4 is to be inserted into the carrier device 16 in the longitudinal direction of the measuring tube arrangement 4 or the carrier device 16.

Figure 2:
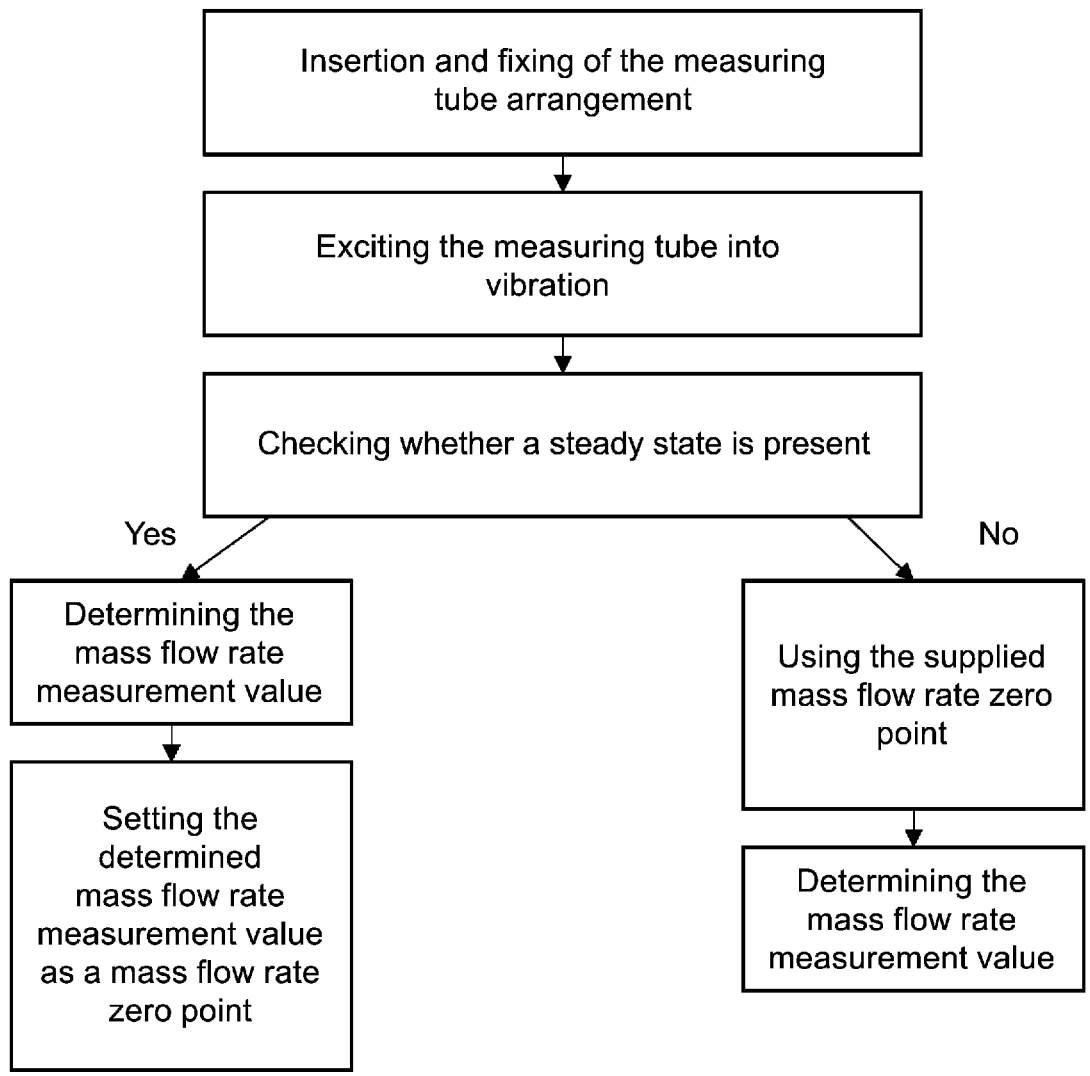
FIG. 2 shows a first embodiment of the method according to the invention for putting a Coriolis flow meter into operation in the form of a flow chart.

FIG. 2 shows a first embodiment of the method according to the invention for putting a Coriolis flow meter into operation in the form of a flow chart. In a first method step, the part of the Coriolis flow meter forming the disposable article—the measuring tube arrangement—is inserted into and fixed in the receptacle of the carrier device. The measuring tube arrangement comprises at least one measuring tube. In order to determine whether a steady state is present in the at least one measuring tube, the measuring tube is excited into vibration. For this purpose, an excitation signal is applied to the vibration exciter. The vibration exciter generates a temporally variable magnetic field that interacts with the magnetic field generated by the excitation magnet attached to the measuring tube and thus exerts a force on the at least one measuring tube. This force causes the at least one measuring tube to vibrate. After the excitation of the measuring tube, a measurement value of a state variable is determined, which measurement value serves as a measure for checking whether there is a steady state in the measuring tube in the carrier device. The state variable can be an excitation current that flows through the excitation coil in order to generate the temporally variable magnetic field or a variable dependent on the excitation current. Alternatively, the state variable can be the damping of the measuring tube that affects the vibration or a variable dependent on the damping. According to an advantageous embodiment, the state variable is a density measurement value of the present medium or a variable dependent on the density measurement value. The state variable can also be a dynamic viscosity or a variable dependent on the dynamic viscosity of the medium present in the measuring tube. Alternatively, the state variable can be a measurement frequency $f_M$, a measurement amplitude $A_M$ or a reciprocal or square of the reciprocal of the measurement frequency $f_M$ of the determined vibration signal. If the Coriolis flow meter has two vibration sensors, the two vibration signals respectively determined on the two vibration sensors, in particular the respective measurement frequencies and measurement amplitudes, can be taken into account for determining the presence of a steady state. If the Coriolis flow meter comprises two measuring tubes, each of which is coupled to two vibration sensors, the four vibration signals are included in the check with the respective measurement frequencies and/or measurement amplitudes.

In the next step, a check is performed as to whether a steady state is present. For this purpose, a deviation between the determined measurement value of the state variable and a reference value is determined. The reference value can be determined and made available by a further sensor or provided at the factory. The sensor can thus be integrated in a hose system and/or plastic tube system with which the measuring tube arrangement is also fluidically coupled. The reference value can be a maximum or minimum excitation current, the density of water or air, the viscosity of water or air, a reference frequency, a reference amplitude, a minimum or maximum damping and/or a variable dependent thereon.

If no steady state is present even after a defined time interval, the Coriolis flow meter assumes its operation and the mass flow rate is determined as a function of the factory-provided mass flow rate zero point. Alternatively, the operating circuit can be configured to carry out an automatic comparison if a steady state is present at a later point in time.

If a steady state is present, a current mass flow rate measurement value is determined and set as a new mass flow rate zero point. The subsequent mass flow rate measurement values are determined while taking into account the new mass flow rate zero point.

Figure 3:
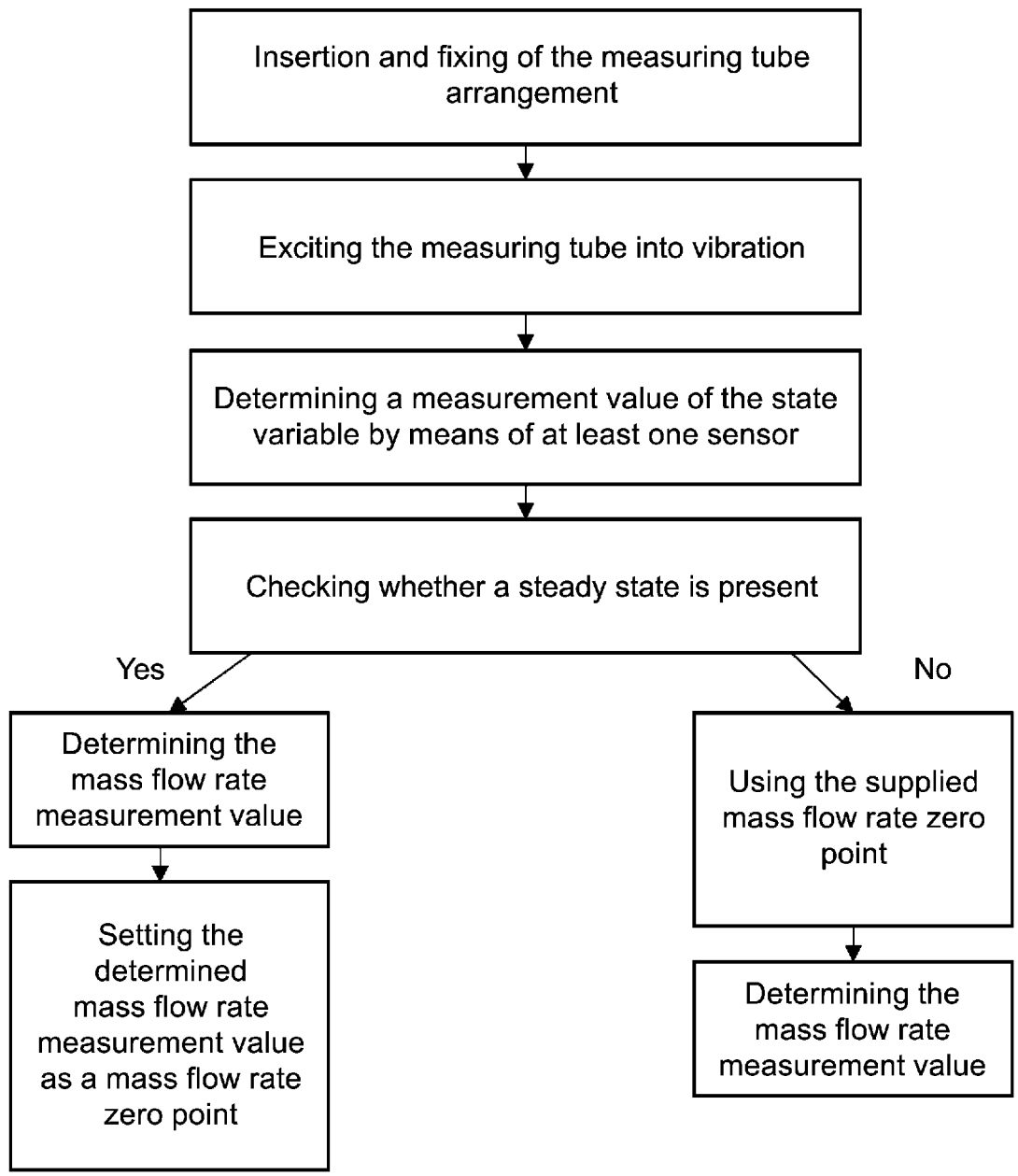
FIG. 3 shows a second embodiment of the method according to the invention for putting a Coriolis flow meter into operation in the form of a flow diagram.

FIG. 3 shows a second embodiment of the method according to the invention for putting a Coriolis flow meter into operation in the form of a flow chart. The second embodiment differs from the first embodiment in that the determination of the measurement value of the state variable is not carried out using the vibration sensor or vibration sensors, but by means of further sensors that are not based on the Coriolis principle. This can be a temperature sensor, for example, that is arranged on the measuring tube. The consideration of measurement values, for example, absolute temperature or temperature difference, of at least two temperature sensors attached to the measuring tube arrangement would be more advantageous.

The invention claimed is:

1. A method for commissioning a Coriolis flow meter for operation, wherein the Coriolis flow meter comprises:
 a measuring tube arrangement, wherein the measuring tube arrangement comprises at least one measuring tube through which a medium can flow;
 at least one vibration exciter comprising an excitation magnet and an excitation coil and configured to excite the measuring tube arrangement to vibrate, wherein the excitation magnet is disposed on the at least one measuring tube;
 at least one vibration sensor comprising a sensor magnet and a sensor coil and configured to detect vibrations of the at least one measuring tube, wherein the sensor magnet is attached to the measuring tube arrangement;
 a carrier device comprising a receiving device, the sensor coil of the at least one vibration sensor and the excitation coil of the at least one vibration exciter, wherein the receiving device includes a receptacle, and wherein the receiving device is configured such that the measuring tube arrangement can be arranged at least partially in the receptacle of the receiving device and can be mechanically detachably connected to the carrier device;
 an operating circuit configured to communicate with the at least one vibration exciter and to operate the excitation coil via at least one excitation signal, which includes an excitation current;
 a measuring circuit disposed in the carrier device, the measuring circuit configured to communicate with the at least one vibration sensor and to determine at least one vibration signal via the at least one vibration sensor;
 an evaluation circuit configured to communicate with the measuring circuit and to determine and provide mass flow rate measurement values, viscosity values and/or density measurement values, and/or values of a variable derived therefrom, based at least on the at least one vibration signal or on a variable derived from the at least one vibration signal,
the method comprising:
 inserting the measuring tube arrangement into the receptacle of the carrier device;
 causing the at least one measuring tube to vibrate via the at least one excitation signal supplied to the at least one vibration exciter as provided by the operating circuit;
 determining a measurement value of a state variable;
 determining whether the at least one measuring tube in the carrier device is in a steady state based on whether a difference between the measurement value of the state variable and a reference value of a reference variable is below an upper limit value and exceeds a lower limit value, wherein the reference value of the reference variable is determined in a preceding adjustment operation of the measuring tube arrangement;
 determining a mass flow rate measurement value; and
 commissioning the flow meter by:
  when the at least one measuring tube in the carrier device is determined to be in the steady state, setting the determined mass flow rate measurement value as a mass flow rate zero point in the evaluation circuit; or
  when the at least one measuring tube in the carrier device is determined to be not in the steady state, setting a mass flow rate zero point determined in the preceding adjustment operation as the mass flow rate zero point in the evaluation circuit.

2. The method of claim 1, wherein the measuring circuit is configured to determine an excitation current impressed on the excitation coil, and wherein the state variable is the excitation current or a variable dependent at least on the excitation current.

3. The method of claim 1, wherein the state variable is a damping of the at least one measuring tube.

4. The method of claim 3, wherein the damping of the at least one measuring tube is one of a lateral mode damping, a torsional mode damping or a variable dependent on the damping.

5. The method of claim 1, further comprising determining vibrations of the measuring tube arrangement using a voltage signal the at least one vibration signal detected at the vibration sensor, wherein the determined vibration signal has a measurement frequency and a measurement amplitude.

6. The method of claim 5, wherein the state variable is the measurement frequency or a measured variable dependent on the measurement frequency.

7. The method of claim 5, wherein the state variable is dependent on a reciprocal of the measurement frequency or a square of the reciprocal of the measurement frequency or is dependent at least on a measured variable dependent on the reciprocal of the measurement frequency or the square of the reciprocal of the measurement frequency.

8. The method of claim 5, wherein the state variable is the measurement amplitude or a variable dependent on the measurement amplitude.

9. The method of claim 1, wherein the state variable is a density measurement value of a medium presently conveyed through the measuring tube arrangement or a variable dependent at least on the density measurement value of the medium.

10. The method of claim 1, wherein the state variable is a dynamic viscosity measurement value of a medium presently conveyed through the measuring tube arrangement or a variable dependent at least on the viscosity measurement value of the medium.

11. The method of claim 1, wherein:
the at least one vibration exciter comprises a first vibration exciter, including a first excitation magnet; and
the at least one vibration sensor comprises a first vibration sensor, which includes a first sensor magnet, and a second vibration sensor, which includes a second sensor magnet,
the method further comprising:
determining vibrations of the measuring tube arrangement via a first vibration signal detected at the first vibration sensor, wherein the determined first vibration signal has a first measurement frequency and a first measurement amplitude, wherein the first excitation magnet is disposed on the measuring tube arrangement;
determining vibrations of the measuring tube arrangement via a second vibration signal detected at the second vibration sensor, wherein the determined second vibration signal has a second measurement frequency and a second measurement amplitude, wherein the second excitation magnet is disposed on the at least one measuring tube.

12. The method of claim 11, wherein the state variable is the first vibration signal or a variable dependent at least on the first vibration signal, and/or wherein the state variable is the second vibration signal or a variable dependent at least on the second vibration signal.

13. The method of claim 11, wherein the measuring tube arrangement or the carrier device comprises at least one temperature sensor, wherein the state variable is a temperature measurement value determined by the at least one temperature sensor.

14. The method of claim 11, wherein the measuring tube arrangement or the carrier device comprises two temperature sensors, each of which is configured to determine a temperature of the at least one measuring tube, wherein the state variable is a difference between the two temperatures determined by the two temperature sensors.

15. The method of claim 1, wherein the carrier device includes a readout unit configured to read sensor information stored in the measuring tube arrangement after the measuring tube arrangement is inserted into the receptacle of the carrier device,
the method further comprising reading out the sensor information stored in the measuring tube arrangement.

16. The method of claim 15, wherein the sensor information comprises the reference value of the reference variable.

17. The method of claim 15, further comprising performing a plausibility comparison between the sensor information and the determined mass flow rate measurement value relative to an upper tolerance limit and/or a lower tolerance limit,
wherein the sensor information comprises a measurement value of the mass flow rate zero point determined via the preceding adjustment operation.

18. The method of claim 1, wherein determining the measurement value of the state variable is performed under the exclusive presence of a gas or a non-flowing medium.

19. The method of claim 1, further comprising, when the mass flow rate zero point in the evaluation circuit has been set to the mass flow rate zero point determined in the preceding adjustment operation, subsequently, initiating a comparison of a mass flow rate zero point for measuring a flowing medium only when:
a currently determined mass flow rate measurement value is less than 10% of a reference mass flow; and
a currently determined density measurement value and/or a currently determined viscosity value corresponds to that of water or air.

20. The method of claim 19, wherein the comparison of the mass flow rate zero point for the flowing medium is initiated only when:
the currently determined mass flow rate measurement value is less than 3% of the reference mass flow; and
the currently determined density measurement value and/or the currently determined viscosity value corresponds to that of water or air.

* * * * *